United States Patent
Czoykowski et al.

(10) Patent No.: US 8,226,526 B2
(45) Date of Patent: Jul. 24, 2012

(54) ELECTRO-HYDRAULIC CONTROL SYSTEM FOR A HYBRID DRIVE UNIT

(75) Inventors: John R. Czoykowski, Grosse Pointe Park, MI (US); Michael L. Duhaime, Northville, MI (US); Chinar S. Ghike, Livonia, MI (US); Mark A. Vernacchia, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 12/771,120

(22) Filed: Apr. 30, 2010

(65) Prior Publication Data

US 2011/0269598 A1 Nov. 3, 2011

(51) Int. Cl.
*B60W 10/02* (2006.01)
*F16H 61/06* (2006.01)

(52) U.S. Cl. .................................. 477/5; 477/146
(58) Field of Classification Search ............... 477/5, 74, 477/146
See application file for complete search history.

(56) References Cited

U.S. PATENT DOCUMENTS

| | | | | |
|---|---|---|---|---|
| 5,161,434 A | * | 11/1992 | Hayasaki | 477/119 |
| 7,517,296 B2 | * | 4/2009 | Foster et al. | 475/161 |
| 2005/0288153 A1 | * | 12/2005 | Whitton | 477/146 |
| 2009/0075780 A1 | * | 3/2009 | Martini et al. | 477/77 |

\* cited by examiner

*Primary Examiner* — Edwin A Young
(74) *Attorney, Agent, or Firm* — Quinn Law Group, PLLC

(57) ABSTRACT

A control system for a hybrid drive unit includes a pressure regulator valve, a first variable bleed solenoid valve for controlling a stationary clutch and a second variable bleed solenoid valve for controlling a rotating clutch. The control system controls the stationary clutch and the rotating clutch to operate the hybrid drive unit in four different modes.

20 Claims, 1 Drawing Sheet

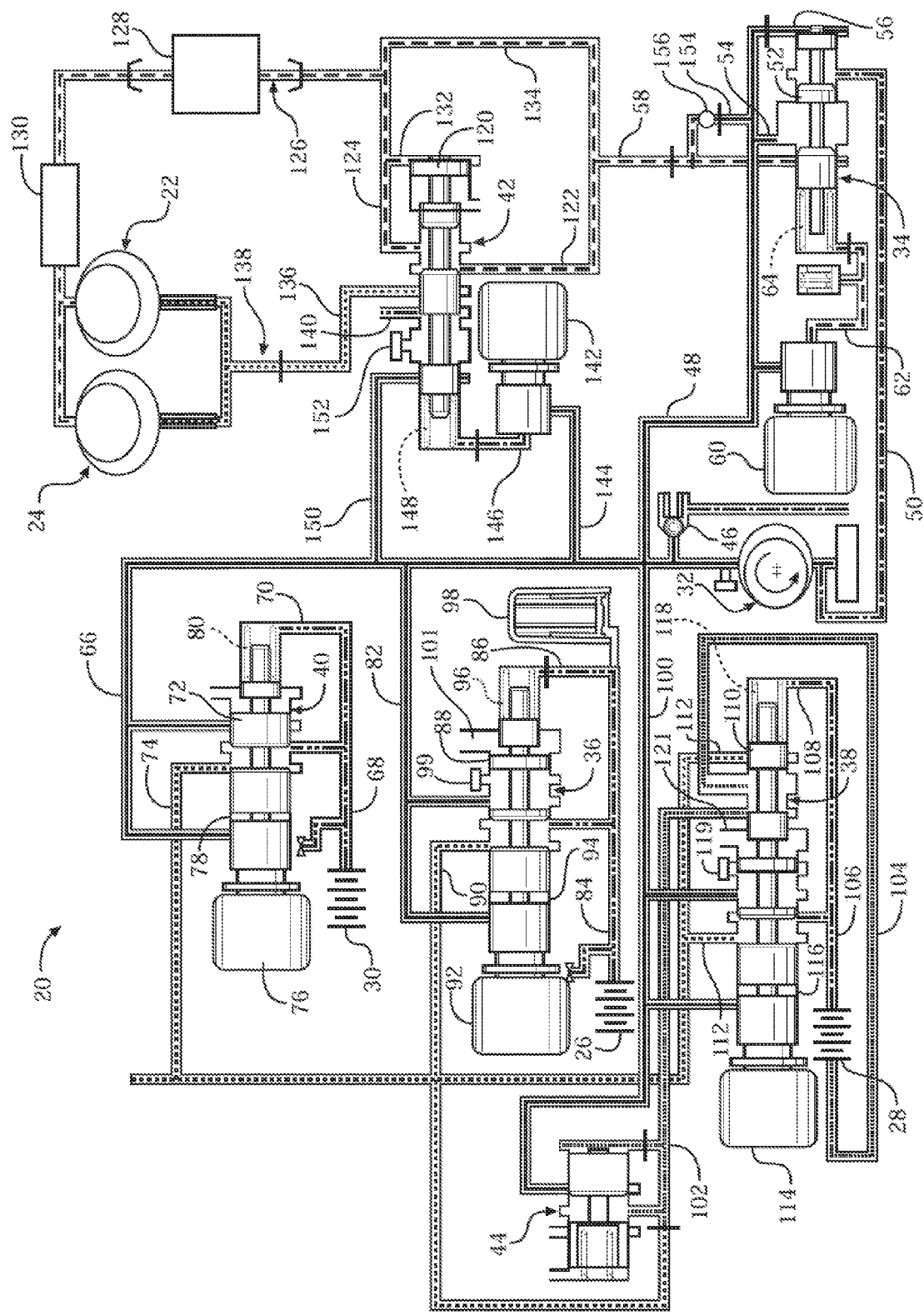

ELECTRO-HYDRAULIC CONTROL SYSTEM FOR A HYBRID DRIVE UNIT

TECHNICAL FIELD

The invention generally relates to a control system for controlling a hybrid drive unit.

BACKGROUND

Hybrid vehicles typically include one or more electric motors and an engine for generating a torque, and a hybrid drive unit, i.e., a transmission, for routing the torque to at least one wheel through a plurality of different gear sets. The hybrid drive unit typically includes a plurality of planetary gear sets, each including a plurality of gear members. The hybrid drive unit also includes a plurality of different torque transmitting devices, such as clutches and brakes that are configured for selectively interconnecting the engine and/or the electric motors with various members of the planetary gear sets.

A control system controls the operation of the hybrid drive unit. The control system typically includes a plurality of hydraulic valves housed in a valve body and configured for actuating, i.e., engaging or disengaging, the various torque transmitting devices to route the torque through different power flow paths to provide different operating modes.

SUMMARY

A control system for controlling a hybrid drive unit of a vehicle is disclosed. The control system includes a pressure regulator valve in fluid communication with a plurality of fluid lines. The pressure regulator valve is configured for regulating a line pressure of a fluid within the plurality of fluid lines. A first valve is in fluid communication with at least one of the plurality of fluid lines, and is configured for opening and closing fluid communication between the plurality of fluid lines and a first clutch. Opening and closing fluid communication between the plurality of fluid lines and the first clutch engages and disengages the first clutch respectively. A second valve is in fluid communication with at least one of the plurality of fluid lines, and is configured for opening and closing fluid communication between the plurality of fluid lines and a second clutch. Opening and closing fluid communication between the plurality of fluid lines and the second clutch engages and disengages the second clutch respectively. The first valve disengages the first clutch and the second valve disengages the second clutch to operate the hybrid drive unit in a first mode. The first valve engages the first clutch and the second valve disengages the second clutch to operate the hybrid drive unit in a second mode. The first valve engages the first clutch and the second valve engages the second clutch to operate the hybrid drive unit in a third mode. The first valve disengages the first clutch and the second valve engages the second clutch to operate the hybrid drive unit in a fourth mode.

In another aspect of the invention, a control system for controlling a hybrid drive unit of a vehicle is disclosed. The control system includes a pressure regulator valve in fluid communication with a plurality of fluid lines. The pressure regulator valve is configured for regulating a line pressure of a fluid within the plurality of fluid lines. A first electronically controlled hydraulic valve is in fluid communication with at least one of the plurality of fluid lines, and is configured for opening and closing fluid communication between the plurality of fluid lines and a first clutch. Opening and closing fluid communication between the plurality of fluid lines and the first clutch engages and disengages the first clutch respectively. A second electronically controlled hydraulic valve is in fluid communication with at least one of the plurality of fluid lines, and is configured for opening and closing fluid communication between the plurality of fluid lines and a second clutch. Opening and closing fluid communication between the plurality of fluid lines and the second clutch engages and disengages the second clutch respectively. A third electronically controlled hydraulic valve is in fluid communication with at least one of the plurality of fluid lines, and is configured for opening and closing fluid communication between the plurality of fluid lines and a third clutch. Opening and closing fluid communication between the plurality of fluid lines and the third clutch engages and disengages the third clutch respectively. A fourth electronically controlled hydraulic valve is in fluid communication with at least one lubrication circuit and the pressure regulator valve. The fourth valve is configured for regulating a flow of the fluid between the pressure regulator valve and the at least one lubrication circuit. The first valve disengages the first clutch and the second valve disengages the second clutch to operate the hybrid drive unit in a first mode. The first valve engages the first clutch and the second valve disengages the second clutch to operate the hybrid drive unit in a second mode. The first valve engages the first clutch and the second valve engages the second clutch to operate the hybrid drive unit in a third mode. The first valve disengages the first clutch and the second valve engages the second clutch to operate the hybrid drive unit in a fourth mode.

In another aspect of the invention, a control system for controlling a hybrid drive unit of a vehicle is disclosed. The control system includes a pressure regulator valve in fluid communication with a plurality of fluid lines. The pressure regulator valve is configured for regulating a line pressure of a fluid within the plurality of fluid lines. A first electronically controlled hydraulic valve is in fluid communication with at least one of the plurality of fluid lines. The first valve is configured for opening and closing fluid communication between the plurality of fluid lines and a stationary clutch for engaging and disengaging the stationary clutch respectively. An accumulator is in fluid communication with the first valve, and is configured for damping fluid movement between the first valve and the first clutch. A second electronically controlled hydraulic valve is in fluid communication with at least one of the plurality of fluid lines. The second valve is configured for opening and closing fluid communication between the plurality of fluid lines and a rotating clutch for engaging and disengaging the rotating clutch respectively. A compensator feed valve is in fluid communication with the plurality of fluid lines and the second valve. The compensator feed valve is configured for supplying the fluid to the second valve, with the second valve being configured for directing the fluid to the rotating clutch to provide a back pressure to the rotating clutch when the second valve disengages the rotating clutch. A third electronically controlled hydraulic valve is in fluid communication with at least one of the plurality of fluid lines. The third valve is configured for opening and closing fluid communication between the plurality of fluid lines and a damper bypass clutch for engaging and disengaging the damper bypass clutch respectively. A fourth electronically controlled hydraulic valve is in fluid communication with a rotor lubrication circuit, a stator lubrication circuit and the pressure regulator valve. The fourth valve is configured for regulating a flow of the fluid between the pressure regulator valve, the rotor lubrication circuit and the stator lubrication circuit. The pressure regulator valve opens fluid communication with the fourth valve in response to the line pressure of the fluid reaching a pre-determined level. The fourth valve continuously maintains open fluid communication between the pressure regulator valve and the first lubrication circuit. The fourth valve opens fluid communication with the second lubrication circuit in response to the line pressure of the fluid reaching a pre-determined level. The first valve disengages the stationary clutch and the second valve disengages the rotating clutch to operate the hybrid drive unit in a first mode. The first valve engages the stationary clutch and the second valve disengages the rotating clutch to operate the hybrid drive unit in a second mode. The first valve engages the stationary clutch and the second valve engages the rotating clutch to operate the hybrid drive unit in a third mode. The first valve disengages the stationary clutch and the second valve engages the rotating clutch to operate the hybrid drive unit in a fourth mode.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The FIGURE is a schematic diagram of a control system for a hybrid drive unit.

DETAILED DESCRIPTION

Referring to the FIGURE, a control system is shown generally at 20. The control system 20 controls the operation of a hybrid drive unit of a vehicle.

The hybrid drive unit, i.e., a transmission for a hybrid vehicle, includes a plurality of clutches configured for interconnecting, in various combinations, a first electric motor 22, a second electric motor 24 and an engine, with a plurality of gear sets. The engine may include any type of engine suitable for use in a hybrid vehicle. For example, the engine includes an internal combustion engine. However, it should be appreciated that the engine may include some other type of engine not described herein. The specific type, size, shape and/or configuration of the engine is not relevant to the description of the invention, and therefore is not described in detail herein. The first electric motor 22 and the second electric motor 24 may include any suitable type, size, shape and/or configuration of electric motor suitable for use in a hybrid vehicle. The specific type, size shape and/or configuration of the first electric motor 22 and the second electric motor 24 are not relevant to the description of the invention, and therefore are not described in detail herein.

As described herein, the hybrid drive unit includes a first clutch and a second clutch. The first clutch includes a stationary clutch 26, and the second clutch includes a rotating clutch 28. The hybrid drive unit operates in four modes: a first mode hereinafter referred to as an Electronic Torque Converter (ETC) mode, a second mode hereinafter referred to as a low mode, a third mode hereinafter referred to as a fixed gear mode, and a fourth mode hereinafter referred to as a high mode. When in the ETC mode, the first clutch and the second clutch are both disengaged. When in the low mode, the first clutch is engaged and the second clutch is disengaged. When in the fixed gear mode, both the first clutch and the second clutch are engaged. When in the high mode, the first clutch is disengaged and the second clutch is engaged. The low mode provides a low gear ratio for operating the hybrid drive unit at lower speeds, while the high mode provides a high gear ratio for operating the hybrid drive unit at higher speeds.

The hybrid drive unit further includes a third clutch, hereinafter referred to as a damper bypass clutch 30, and a pump 32. The damper bypass clutch 30 directly interconnects the hybrid drive unit and the engine. The damper bypass clutch 30 is engaged to directly connect the hybrid drive unit and the engine during operation of the vehicle at high speeds, and when starting the engine. When engaged, the damper bypass clutch 30 provides a fixed connection between the engine and the hybrid drive unit. When disengaged, the damper bypass clutch 30 allows the hybrid drive unit to torsionally flex relative to the engine through a plurality of damper springs as is known. The pump 32 pressurizes and circulates a fluid through the hybrid drive unit and the control system 20. The pump 32 may include any suitable type and/or size of pump 32 capable of providing sufficient flow and pressure. The specific type, size and/or configuration of the pump 32 are not relevant to the description of the invention, and is therefore not described in detail herein.

Referring to the FIGURE, the control system 20 includes a valve body, which is coupled to the hybrid drive unit. The valve body includes, but is not limited to, a pressure regulator valve 34, a first valve hereinafter referred to as a stationary clutch valve 36, a second valve hereinafter referred to as a rotating clutch valve 38, a third valve hereinafter referred to as a damper bypass valve 40, a fourth valve hereinafter referred to as a lube regulator valve 42 and a compensator feed valve 44.

The pump 32 pressurizes the fluid to a line pressure, and circulates the fluid at the line pressure to the damper bypass valve 40, the stationary clutch valve 36, the rotating clutch valve 38, the compensator feed valve 44, the pressure regulator valve 34, the lube regulator valve 42, a variable bleed solenoid 92, a variable bleed solenoid 114, a variable bleed solenoid 76, a mini direct acting solenoid 60, and a lube boost solenoid 142. Accordingly, the pump 32 is in direct fluid communication with the damper bypass valve 40, the stationary clutch valve 36, the rotating clutch valve 38, the compensator feed valve 44, the pressure regulator valve 34, the lube regulator valve 42, the variable bleed solenoid 92, the variable bleed solenoid 114, the variable bleed solenoid 76, the mini direct acting solenoid 60, the lube boost solenoid 142 through a system of high pressure fluid lines and/or passages in the valve body.

The valve body further includes a line blow-off 46. The line blow-off 46 is a pressure sensitive valve that opens in response to the line pressure reaching a pre-determined level. The line blow-off 46 prevents damage to the control system 20 and/or the hybrid drive unit by opening the line pressure to the atmosphere in response to the line pressure reaching a dangerously high level.

A first fluid line 48 interconnects the pump 32 and the pressure regulator valve 34 to provide the fluid to the pressure regulator valve 34 at the line pressure. A suction return line 50 interconnects the pressure regulator valve 34 with a sump portion of the pump 32 for directing fluid back to the pump 32 to reduce the line pressure. The pressure regulator valve 34 includes a spool portion 52 that is moveable between a first position, a second position and a third position. The first fluid line 48 includes a feed line 54 and a feedback line 56 for providing the fluid to the spool portion 52 at the line pressure. The feedback line 56 acts against an end of the spool portion 52 of the pressure regulator valve 34 to bias against the spool portion 52.

When in the first position, which is shown in the FIGURE, the pressure regulator valve 34 operates to maintain the existing line pressure. When in the first position, the spool portion 52 of the pressure regulator valve 34 prevents fluid flow from the feed line 54 from flowing back to the pump 32 via the suction return line 50, and also prevents fluid flow to the lube regulator valve 42 via a second fluid line 58, which interconnects the pressure regulator valve 34 and the lube regulator valve 42.

When in the second position, the spool portion 52 of the pressure regulator valve 34 opens fluid communication between the feed line 54 and the second fluid line 58 to supply the lube regulator valve 42 with fluid at the line pressure, while still preventing fluid communication between the feed line 54 and the suction return line 50. The pressure regulator valve 34 moves into the second position in response to the fluid pressure reaching a minimum supply pressure, which is the level required to supply all priority operations of the control system 20. The priority operations of the control system 20 include supplying the damper bypass valve 40, the stationary clutch valve 36, the rotating clutch valve 38 and the compensator feed valve 44 with fluid at the line pressure. Once the priority operations of the control system 20 are satisfied, the pressure regulator valve 34 may move into the second position to supply the lube regulator valve 42, which is a secondary operation of the control system 20.

When in the third position, the spool portion 52 of the pressure regulator valve 34 maintains fluid communication between the feed line 54 and the second fluid line 58, while opening fluid communication between the feed line 54 and the suction return line 50. The pressure regulator valve 34 moves into the third position when the line pressure exceeds a maximum allowable pressure. When in the third position, the fluid is directed from the feed line 54 to the sump portion of the pump 32 to reduce the line pressure. Once the line pressure is reduced to an acceptable level, the pressure regulator valve 34 may move back into either the second or the first position.

The pressure regulator valve 34 may include a Mini direct acting (MDA) solenoid 60 in fluid communication with the first fluid line 48. However, it should be appreciated that the pressure regulator valve 34 may include any suitable type of solenoid 60 capable of controlling the spool portion 52 of the pressure regulator valve 34. The solenoid 60 of the pressure regulator valve 34 utilizes an electrical signal from a hybrid drive unit controller or a vehicle controller to open and close fluid communication from the first fluid line 48 to an end of the spool portion 52 of the pressure regulator valve 34 to actuate the spool portion 52 of the pressure regulator valve 34. As such, the pressure regulator valve 34 is an electronically controlled hydraulic valve.

A pressure regulator signal line 62 interconnects the solenoid 60 of the pressure regulator valve 34 with an end of the spool portion 52 of the pressure regulator valve 34. The pressure regulator signal line 62 provides a fluid pressure, which acts against the spool portion 52 of the pressure regulator valve 34 to bias the spool portion 52 of the pressure regulator valve 34 against the fluid pressure provided by the feedback line 56 of the pressure regulator valve 34. The solenoid 60 of the pressure regulator valve 34 controls the fluid pressure of the pressure regulator signal line 62 to control movement of the spool portion 52 of the pressure regulator valve 34 between the first position, the second position and the third position. By reducing the fluid pressure of the pressure regulator signal line 62, the spool portion 52 of the pressure regulator valve 34 moves from the first position toward the second and/or the third position. By increasing the fluid pressure of the pressure regulator signal line 62 to the line pressure, the pressure regulator signal line 62, in combination with a regulator spring 64, move the spool portion 52 of the pressure regulator valve 34 into the first position.

The solenoid 60 of the pressure regulator valve 34 is normally open, or normally high, to maintain the fluid pressure of the pressure regulator signal line 62 at the line pressure to move the spool portion 52 of the pressure regulator valve 34 into the first position. The solenoid 60 of the pressure regulator valve 34 closes, or reduces the fluid pressure of the pressure regulator signal line 62 as the line pressure increases to above the minimum supply pressure and/or the maximum allowable pressure to move the spool portion 52 into the second position or the third position to regulate the line pressure.

A third fluid line 66 interconnects the pump 32 and the damper bypass valve 40 to provide the fluid to the damper bypass valve 40 at the line pressure. A damper control line 68 interconnects the damper bypass valve 40 and the damper clutch. A damper feedback line 70 interconnects the damper control line 68 and an end of the damper bypass valve 40. The damper bypass valve 40 includes a spool portion 72 that is moveable between an open position and a closed position. The damper feedback line 70 provides fluid to an end of the spool portion 72 of the damper bypass valve 40 to bias against the spool portion 72 of the damper bypass valve 40. When in the closed position, which is shown in the FIGURE, the spool portion 72 of the damper bypass valve 40 prevents fluid communication between the third fluid line 66 and the damper control line 68 to prevent engagement of the damper bypass clutch 30, and exhausts fluid pressure from the damper control line 68 via an exhaust line 74 to disengage the damper bypass clutch 30. When in the open position, the spool portion 72 of the damper bypass valve 40 opens fluid communication between the third fluid line 66 and the damper control line 68 to provide fluid to the damper bypass clutch 30 at the line pressure to engage the damper bypass clutch 30. Additionally, when in the open position, the spool portion 72 closes fluid communication between the damper bypass valve 40 and the exhaust line 74 to prevent disengagement of the damper bypass clutch 30.

The damper bypass valve 40 may include a variable bleed solenoid 76. However, it should be appreciated that the damper bypass valve 40 may include any suitable type of solenoid 76 capable of controlling the damper bypass valve 40. The solenoid 76 of the damper bypass valve 40 is in fluid communication with the third fluid line 66 and utilizes an electrical signal from the hybrid drive unit controller or the vehicle controller to open and close fluid communication between the third fluid line 66 and a damper bypass signal line 78. Accordingly, the damper bypass valve 40 is an electronically controlled hydraulic valve.

The damper bypass signal line 78 interconnects the solenoid 76 of the damper bypass valve 40 with a second end of the spool portion 72 of the damper bypass valve 40. The damper bypass signal line 78 provides a fluid pressure, which acts against the spool portion 72 of the damper bypass valve 40 to bias the spool portion 72 of the damper bypass valve 40 against the fluid pressure provided by the damper feedback line 70. The solenoid 76 of the damper bypass valve 40 controls the fluid pressure of the damper bypass signal line 78 to control movement of the spool portion 72 of the damper bypass valve 40 between the open position and the closed position. By increasing the fluid pressure of the damper bypass signal line 78 to the line pressure, the damper bypass signal line 78 overcomes the reactionary force provided by the damper feedback line 70, in combination with a damper spring 80, to move the spool portion 72 of the damper bypass valve 40 into the open position. By decreasing the fluid pressure of the damper bypass signal line 78 to below the line pressure, the damper feedback line 70 and the damper spring 80 overcome the damper bypass signal line 78 and move the spool portion 72 into the closed position, thereby opening fluid communication with the exhaust line 74 and disengaging the damper bypass clutch 30. The solenoid 76 of the damper bypass valve 40 is normally closed, or normally low, to position the spool portion 72 of the damper bypass valve 40 in the closed position with the damper bypass clutch 30 disengaged. The solenoid 76 of the damper bypass valve 40 increases fluid pressure in the damper bypass signal line 78 when directed to engage the damper bypass clutch 30.

A fourth fluid line 82 interconnects the pump 32 and the stationary clutch valve 36 to provide the fluid to the stationary clutch valve 36 at the line pressure. A stationary clutch control line 84 interconnects the stationary clutch valve 36 and the stationary clutch 26. A stationary clutch feedback line 86 interconnects the stationary clutch control line 84 and an end of the stationary clutch valve 36. The stationary clutch valve 36 includes a spool portion 88 that is moveable between an open position and a closed position. The stationary clutch feedback line 86 provides fluid to an end of the spool portion 88 of the stationary clutch valve 36 to bias against the spool portion 88 of the stationary clutch valve 36. When in the closed position, which is shown in the FIGURE, the spool portion 88 of the stationary clutch valve 36 prevents fluid communication between the fourth fluid line 82 and the stationary clutch control line 84 to prevent engagement of the stationary clutch 26, and exhausts fluid pressure from the stationary clutch control line 84 via the exhaust line 90 to disengage the stationary clutch 26. When in the open position, the spool portion 88 of the stationary clutch valve 36 opens fluid communication between the fourth fluid line 82 and the stationary clutch control line 84 to provide fluid to the stationary clutch 26 at the line pressure to engage the stationary clutch 26. Additionally, when in the open position, the spool portion 88 of the stationary clutch valve 36 closes fluid communication between the stationary clutch valve 36 and an exhaust line 90 to prevent disengagement of the stationary clutch 26.

The stationary clutch valve 36 may include a variable bleed solenoid 92. However, it should be appreciated that the stationary clutch valve 36 may include any suitable type of solenoid 92 capable of controlling the spool portion 88 of the stationary clutch valve 36. The solenoid 92 of the stationary clutch 26 is in fluid communication with the fourth fluid line 82, and utilizes an electrical signal from the hybrid drive unit controller or the vehicle controller to open and close fluid communication between the fourth fluid line 82 and a stationary clutch signal line 94. Accordingly, the stationary clutch valve 36 is an electronically controlled hydraulic valve.

The stationary clutch signal line 94 interconnects the solenoid 92 of the stationary clutch valve 36 with a second end of the spool portion 88 of the stationary clutch valve 36. The stationary clutch signal line 94 provides a fluid pressure, which acts against the spool portion 88 of the stationary clutch valve 36 to bias the spool portion 88 of the stationary clutch valve 36 against the fluid pressure provided by the stationary clutch feedback line 86. The solenoid 92 of the stationary clutch valve 36 controls the fluid pressure of the stationary clutch signal line 94 to control movement of the spool portion 88 of the stationary clutch valve 36 between the open position and the closed position. By increasing the fluid pressure of the stationary clutch signal line 94 to the line pressure, the stationary clutch signal line 94 overcomes the reactionary force provided by the stationary clutch feedback line 86, in combination with a stationary clutch spring 96, to move the spool portion 88 of the stationary clutch valve 36 into the open position. By decreasing the fluid pressure of the stationary clutch signal line 94 to below the line pressure, the stationary clutch feedback line 86 and the stationary clutch spring 96 overcome the stationary clutch signal line 94 and move the spool portion 88 into the closed position, thereby opening fluid communication with the exhaust line 90 and disengaging the stationary clutch 26. The solenoid 92 of the stationary clutch valve 36 is normally closed, or normally low, to position the spool portion 88 of the stationary clutch valve 36 in the closed position with the stationary clutch 26 disengaged. The solenoid 92 of the stationary clutch valve 36 increases fluid pressure in the stationary clutch signal line 94 when directed to engage the stationary clutch 26.

An accumulator 98 is in fluid communication with the stationary clutch feedback line 86 and the stationary clutch control line 84. The accumulator 98 dampens hydraulic shock within the system caused by movement of the fluid between the stationary clutch 26 and the stationary clutch valve 36.

The stationary clutch valve 36 further includes a pressure sensing device 99, and an exhaust line 101. The pressure sensing device 99 may include, but is not limited to, a pressure switch or a pressure sensor. The exhaust line 101 selectively exhausts fluid pressure from the stationary clutch valve 36. When the spool portion 88 of the stationary clutch valve 36 is in the open position, the pressure sensing device 99 is open to the exhaust line 101. When the spool portion 88 of the stationary clutch valve 36 moves to the closed position, shown in the FIGURE, the spool portion 88 closes fluid communication with the exhaust line 101 and opens the pressure sensing device 99 to the fourth fluid line 82. The pressure sensing device 99 is configured for sensing the pressure of the fluid in the stationary clutch valve 36 supplied by the fourth fluid line 82. The position of the stationary clutch valve 36 may be inferred based upon the output signal from the pressure sensing device 99. The hybrid drive unit controller or the vehicle controller may utilize the position information from the pressure sensing device 99 to control the stationary clutch valve 36 and the pump 32 as required to preserve the priority operations of the control system 20. The pressure sensing device 99 detects the fluid pressure within the stationary clutch valve 36 and provides feedback on how long it may take to completely fill the stationary clutch valve, thereby allowing the hybrid system 20 to adjust appropriately.

A fifth fluid line 100 interconnects the pump 32 with the rotating clutch valve 38 and the compensator feed valve 44. The fifth fluid line 100 provides the fluid to the rotating clutch valve 38 and the compensator feed valve 44 at the line pressure. The compensator feed valve 44 provides a fluid back pressure to the rotating clutch 28 through the rotating clutch valve 38. A compensator exhaust line 102 interconnects the compensator feed valve 44 with the rotating clutch valve 38, and a compensator feed line 104 interconnects the rotating clutch valve 38 with a backside of the rotating clutch 28. The compensator feed valve 44 may include any type of valve suitable for regulating the fluid backpressure for the rotating clutch 28.

A rotating clutch control line 106 interconnects the rotating clutch valve 38 and the rotating clutch 28. A rotating clutch feedback line 108 interconnects the rotating clutch control line 106 and an end of the rotating clutch valve 38. The rotating clutch valve 38 includes a spool portion 110 that is moveable between an open position and a closed position. The rotating clutch feedback line 108 provides fluid to an end of the spool portion 110 of the rotating clutch valve 38 to bias against the spool portion 110 of the rotating clutch valve 38. When in the closed position, which is shown in the FIGURE, the spool portion 110 of the rotating clutch valve 38 prevents fluid communication between the fifth fluid line 100 and the rotating clutch control line 106 to prevent engagement of the rotating clutch 28, and exhausts fluid pressure from the rotating clutch control line 106 via the exhaust line 112 to disengage the rotating clutch 28. Additionally, when in the closed position, the rotating clutch valve 38 opens fluid communication between the compensator exhaust line 102 and the compensator feed line 104 to permit fluid flow to the back side of the rotating clutch 28. When in the open position, the spool portion 110 of the rotating clutch valve 38 opens fluid communication between the fifth fluid line 100 and the rotating clutch control line 106 to provide fluid to the rotating clutch 28 at the line pressure to engage the rotating clutch 28. Furthermore, when in the open position, the spool portion 110 of the rotating clutch valve 38 closes fluid communication between the rotating clutch control line 106 and the exhaust line 112 to prevent disengagement of the rotating clutch 28. Additionally, when in the open position, the rotating clutch valve 38 closes fluid communication between the compensator exhaust line 102 and the compensator feed line 104 to limit and/or prevent fluid communication with the back side of the rotating clutch 28, which would otherwise act against the line pressure being applied to the rotating clutch 28 when the rotating clutch valve 38 is in the open position.

The rotating clutch valve 38 may include a variable bleed solenoid 114. However, it should be appreciated that the rotating clutch valve 38 may include any suitable type of solenoid 114 capable of controlling the spool portion 110 of the rotating clutch valve 38. The solenoid 114 of the rotating clutch 28 is in fluid communication with the fifth fluid line 100, and utilizes an electrical signal from the hybrid drive unit controller or the vehicle controller to open and close fluid communication between the fifth fluid line 100 and a rotating clutch signal line 116. Accordingly, the rotating clutch valve 38 is an electronically controlled hydraulic valve.

The rotating clutch signal line 116 interconnects the solenoid 114 of the rotating clutch valve 38 with a second end of the spool portion 110 of the rotating clutch valve 38. The rotating clutch signal line 116 provides a fluid pressure, which acts against the spool portion 110 of the rotating clutch valve 38 to bias the spool portion 110 of the rotating clutch valve 38 against the fluid pressure provided by the rotating clutch feedback line 108. The solenoid 114 of the rotating clutch valve 38 controls the fluid pressure of the rotating clutch signal line 116 to control movement of the spool portion 110 of the rotating clutch valve 38 between the open position and the closed position. By increasing the fluid pressure of the rotating clutch signal line 116 to the line pressure, the rotating clutch signal line 116 overcomes the reactionary force provided by the rotating clutch feedback line 108, in combination with a rotating clutch spring 118, to move the spool portion 110 of the rotating clutch valve 38 into the open position. By decreasing the fluid pressure of the rotating clutch signal line 116 to below the line pressure, the rotating clutch feedback line 108 and the rotating clutch spring 118 overcome the rotating clutch signal line 116 and move the spool portion 110 into the closed position, thereby opening fluid communication with the exhaust line 112 and disengaging the rotating clutch 28. The solenoid 114 of the rotating clutch valve 38 is normally closed, or normally low, to position the spool portion 110 of the rotating clutch valve 38 in the closed position with the rotating clutch 28 disengaged. The solenoid 114 of the rotating clutch valve 38 increases fluid pressure in the rotating clutch signal line 116 when directed to engage the rotating clutch 28.

The rotating clutch valve 38 further includes a pressure sensing device 119, and an exhaust line 121. The pressure sensing device 119 may include, but is not limited to, a pressure switch or a pressure sensor. The exhaust line 121 selectively exhausts fluid pressure from the rotating clutch valve 38. When the spool portion 110 of the rotating clutch valve 38 is in the open position, the pressure witch 119 is open to the exhaust line 121. When the spool portion 110 of the rotating clutch valve 28 moves to the closed position, shown in the FIGURE, the spool portion 110 closes fluid communication with the exhaust line 121 and opens the pressure sensing device 119 to the fifth fluid line 100. The pressure sensing device 119 is configured for sensing the pressure of the fluid in the rotating clutch valve 38 supplied by the fifth fluid line 100. The position of the rotating clutch valve 38 may be inferred based upon the output signal from the pressure sensing device 119. The hybrid drive unit controller or the vehicle controller may utilize the position information from the pressure sensing device 119 to control the rotating clutch valve 38 and the pump 32 as required to preserve the priority operations of the control system 20. The pressure sensing device 119 detects the fluid pressure within the rotating clutch valve 38 and provides feedback on how long it may take to completely fill the rotating clutch valve 38, thereby allowing the hybrid system 20 to adjust appropriately.

The lube regulator valve 42 includes a spool portion 120 that is moveable between a first position, a second position and a third position. A lube feed line 122 interconnects the second fluid line 58 and the lube regulator valve 42 for supplying fluid to the lube regulator valve 42. A rotor supply line 124 interconnects the lube regulator valve 42 with a rotor lubrication circuit 126. The rotor lubrication circuit 126 circulates the fluid through a heat exchanger 128 to cool the fluid, through a gearbox 130 of the hybrid drive unit, and then through the rotor of each of the first electric motor 22 and the second electric motor 24 to cool and lubricate the rotors. A regulated lube feedback line 132 interconnects the rotor supply line 124 with an end of the spool portion 120 of the lube regulator valve 42. The regulated lube feedback line 132 provides fluid to the lube regulator valve 42 to bias against the spool portion 120 of the lube regulator valve 42. A regulated lube valve bypass line 134 interconnects the second fluid line 58 with the rotor supply line 124 to directly supply fluid to the rotor lubrication circuit 126. A stator supply line 136 interconnects the lube regulator valve 42 a stator lubrication circuit 138. The stator lubrication circuit 138 circulates fluid through the stator of each of the first electric motor 22 and the second electric motor 24 to cool the stators.

When the lube regulator valve 42 is in the first position, which is shown in the FIGURE, the spool portion 120 of the lube regulator valve 42 opens fluid communication between the lube feed line 122 and the rotor supply line 124, and closes fluid communication between the lube feed line 122 and the stator supply line 136, thereby allowing the fluid at the line pressure to flow through the rotor lubrication circuit 126. When the lube regulator valve 42 is in the second position, the spool portion 120 of the lube regulator valve 42 maintains fluid communication between the lube feed line 122 and the rotor supply line 124, and opens fluid communication between the lube feed line 122 and the stator supply line 136, thereby allowing the fluid to flow through the rotor lubrication circuit 126 and the stator lubrication circuit 138. When the lube regulator valve 42 is in the third position, the spool portion 120 of the lube regulator valve 42 closes fluid communication between the lube feed line 122 and the rotor supply line 124 and opens fluid communication between the lube feed line 122 and the stator supply line 136.

The lube regulator valve 42 includes a solenoid 142. The solenoid 142 of the lube regulator valve 42 may include any solenoid 142 capable of controlling the actuation of the spool portion 120 of the lube regulator valve 42. A sixth fluid line 144 interconnects the pump 32 with the solenoid 142 of the lube regulator valve 42. The solenoid 142 of the lube regulator valve 42 utilizes an electrical signal from the hybrid drive unit controller or the vehicle controller to open and close fluid communication between the sixth fluid line 144 and a lube boost signal line 146. Accordingly, the lube regulator valve 42 is an electronically controlled hydraulic valve.

The lube boost signal line 146 interconnects the solenoid 142 of the lube regulator valve 42 with a second end of the spool portion 120 of the lube regulator valve 42. The lube boost signal line 146 provides a fluid pressure, which acts against the spool portion 120 of the lube regulator valve 42 to bias the spool portion 120 of the lube regulator valve 42 against the fluid pressure provided by the regulator lube feedback line. The solenoid 142 of the lube regulator valve 42 controls the fluid pressure of the lube boost signal line 146 to control movement of the spool portion 120 of the lube regulator valve 42 between the first position, the second position and the third position. The solenoid 142 of the lube regulator valve 42 is normally closed, or normally low, to prevent fluid communication between the sixth fluid line 144 and the lube boost signal line 146 and allow a lube regulator spring 148 to bias the spool portion 120 of the lube regulator valve 42 against the fluid pressure supplied by the regulator lube feedback line 132. The solenoid 142 of the lube regulator valve 42 opens and/or increases fluid communication between the sixth fluid line 144 and the lube boost signal line 146 when signaled to move the spool portion 120 of the lube regulator valve 42 from the third position or the second position into one of the second position or the third position.

A seventh fluid line 150 interconnects the pump 32 and the lube regulator valve 42 to provide fluid directly to the lube regulator valve 42 at the line pressure. The spool portion 120 of the lube regulator valve 42 closes fluid communication between the seventh fluid line 150 and the lube regulator valve 42 when the lube regulator valve 42 is in the first position, and opens fluid communication between the seventh fluid line 150 and the lube regulator valve 42 when the lube regulator valve 42 is in the second position and/or the third position. The lube regulator valve 42 includes a pressure sensing device 152, and an exhaust line 140. The pressure sensing device 152 may include, but is not limited to, a pressure switch or a pressure sensor. The pressure sensing device 152 is configured for sensing the pressure of the fluid in the lube regulator valve 42 supplied by the seventh fluid line 150. The exhaust line 140 is configured to selectively exhaust fluid pressure from the lube regulator valve 42. When the spool portion 120 of the lube regulator valve 42 is in the first position, i.e., an open position, the pressure sensing device 152 is open to the exhaust line 140. When the spool portion 120 of the lube regulator valve 42 moves to the second position, i.e., a closed position, shown in the FIGURE, the spool portion 120 closes fluid communication with the exhaust line 140 and opens the pressure sensing device 152 to the seventh fluid line 150. The position of the lube regulator valve 42 may be inferred based upon the output signal from the pressure sensing device 152. The hybrid drive unit controller or the vehicle controller may utilize this position information from the pressure sensing device 152 to control the lube regulator valve 42 and the pump 32 as required to preserve the priority operations of the control system 20 and provide fluid to the rotor lubrication circuit 126 and the stator lubrication circuit 138.

A lube bypass line 154 interconnects the first fluid line 48 and the second fluid line 58. The lube bypass line 154 includes a packaging protected orifice 156. The packaging protected orifice 156 blocks fluid flow through the lube bypass line 154 until the line pressure rises above a pre-determine level, at which time the fluid flows through the packaging protected orifice 156 into the second fluid line 58 to supply fluid to the rotor lubrication circuit 126 and/or the stator lubrication circuit 138. Accordingly, if the pressure regulator valve 34 fails to open fluid communication to the second fluid line 58 to prevent excessive line pressures, the packaging protected orifice 156 is capable of allowing fluid flow through the lube bypass line 154 to provide limited lubrication and cooling to the electric motors 22, 24 and the transmission components.

While the best modes for carrying out the invention have been described in detail, those familiar with the art to which this invention relates will recognize various alternative designs and embodiments for practicing the invention within the scope of the appended claims.

The invention claimed is:

1. A control system for controlling a hybrid drive unit of a vehicle, the control system comprising:
   a pressure regulator valve in fluid communication with a plurality of fluid lines and configured for regulating a line pressure of a fluid within the plurality of fluid lines;
   a first valve in fluid communication with at least one of the plurality of fluid lines and configured for opening and closing fluid communication between the plurality of fluid lines and a first clutch for engaging and disengaging the first clutch respectively; and
   a second valve in fluid communication with at least one of the plurality of fluid lines and configured for opening and closing fluid communication between the plurality of fluid lines and a second clutch for engaging and disengaging the second clutch respectively;
   wherein the first valve disengages the first clutch and the second valve disengages the second clutch to operate the hybrid drive unit in a first mode, the first valve engages the first clutch and the second valve disengages the second clutch to operate the hybrid drive unit in a second mode, the first valve engages the first clutch and the second valve engages the second clutch to operate the hybrid drive unit in a third mode, and the first valve disengages the first clutch and the second valve engages the second clutch to operate the hybrid drive unit in a fourth mode.

2. A control system as set forth in claim 1 further comprising a third valve in fluid communication with the plurality of fluid lines and configured for opening and closing fluid communication between the plurality of fluid lines and a third clutch for engaging and disengaging the third clutch respectively.

3. A control system as set forth in claim 2 further comprising a fourth valve in fluid communication with at least one lubrication circuit and the pressure regulator valve and configured for regulating a flow of the fluid between the pressure regulator valve and the at least one lubrication circuit.

4. A control system as set forth in claim 3 wherein the pressure regulator valve opens fluid communication with the fourth valve in response to the line pressure of the fluid reaching a pre-determined level.

5. A control system as set forth in claim 3 wherein the at least one lubrication circuit includes a first lubrication circuit and a second lubrication circuit.

6. A control system as set forth in claim 5 wherein the fourth valve continuously maintains open fluid communication between the pressure regulator valve and the first lubrication circuit and the fourth valve opens fluid communication with the second lubrication circuit in response to the line pressure of the fluid reaching a pre-determined level.

7. A control system as set forth in claim 3 wherein the first valve, the second valve, the third valve and the fourth valve each include an electronically controlled solenoid for actuating the first valve, the second valve, the third valve and the fourth valve respectively.

8. A control system as set forth in claim 7 wherein the first valve, the second valve and the third valve each include a variable bleed solenoid valve.

9. A control system as set forth in claim 7 wherein the pressure regulator valve includes a mini direct acting solenoid valve.

10. A control system as set forth in claim 1 further comprising an accumulator in fluid communication with the first valve and configured for damping fluid movement between the first valve and the first clutch.

11. A control system as set forth in claim 1 wherein the second clutch includes a rotating clutch and wherein the control system further includes a compensator feed valve in fluid communication with the plurality of fluid lines and the second valve and configured for supplying the fluid to the second valve, with the second valve configured for directing the fluid to the rotating second clutch to provide a back pressure in the rotating second clutch when the second valve disengages the rotating second clutch.

12. A control system for controlling a hybrid drive unit of a vehicle, the control system comprising:
- a pressure regulator valve in fluid communication with a plurality of fluid lines and configured for regulating a line pressure of a fluid within the plurality of fluid lines;
- a first electronically controlled hydraulic valve in fluid communication with at least one of the plurality of fluid lines and configured for opening and closing fluid communication between the plurality of fluid lines and a first clutch for engaging and disengaging the first clutch respectively;
- a second electronically controlled hydraulic valve in fluid communication with at least one of the plurality of fluid lines and configured for opening and closing fluid communication between the plurality of fluid lines and a second clutch for engaging and disengaging the second clutch respectively;
- a third electronically controlled hydraulic valve in fluid communication with at least one of the plurality of fluid lines and configured for opening and closing fluid communication between the plurality of fluid lines and a third clutch for engaging and disengaging the third clutch respectively; and
- a fourth electronically controlled hydraulic valve in fluid communication with at least one lubrication circuit and the pressure regulator valve, and is configured for regulating a flow of the fluid between the pressure regulator valve and the at least one lubrication circuit;
- wherein the first valve disengages the first clutch and the second valve disengages the second clutch to operate the hybrid drive unit in a first mode, the first valve engages the first clutch and the second valve disengages the second clutch to operate the hybrid drive unit in a second mode, the first valve engages the first clutch and the second valve engages the second clutch to operate the hybrid drive unit in a third mode, and the first valve disengages the first clutch and the second valve engages the second clutch to operate the hybrid drive unit in a fourth mode.

13. A control system as set forth in claim 12 wherein the pressure regulator valve opens fluid communication with the fourth valve in response to the line pressure of the fluid reaching a pre-determined level.

14. A control system as set forth in claim 12 wherein the at least one lubrication circuit includes a first lubrication circuit and a second lubrication circuit.

15. A control system as set forth in claim 14 wherein the fourth valve continuously maintains open fluid communication between the pressure regulator valve and the first lubrication circuit and the fourth valve opens fluid communication with the second lubrication circuit in response to the line pressure of the fluid reaching a pre-determined level.

16. A control system as set forth in claim 12 wherein the first valve, the second valve and the third valve each include a variable bleed solenoid valve.

17. A control system as set forth in claim 12 wherein the pressure regulator valve includes a mini direct acting solenoid valve.

18. A control system as set forth in claim 12 further comprising an accumulator in fluid communication with the first valve and configured for damping fluid movement between the first valve and the first clutch.

19. A control system as set forth in claim 12 wherein the second clutch includes a rotating clutch and wherein the control system further includes a compensator feed valve in fluid communication with the plurality of fluid lines and the second valve and configured for supplying the fluid to the second valve, with the second valve configured for directing the fluid to the rotating second clutch to provide a back pressure in the rotating second clutch when the second valve disengages the rotating second clutch.

20. A control system for controlling a hybrid drive unit of a vehicle, the control system comprising:
- a pressure regulator valve in fluid communication with a plurality of fluid lines and configured for regulating a line pressure of a fluid within the plurality of fluid lines;
- a first electronically controlled hydraulic valve in fluid communication with at least one of the plurality of fluid lines and configured for opening and closing fluid communication between the plurality of fluid lines and a stationary clutch for engaging and disengaging the stationary clutch respectively;
- an accumulator in fluid communication with the first valve and configured for damping fluid movement between the first valve and the first clutch;
- a second electronically controlled hydraulic valve in fluid communication with at least one of the plurality of fluid lines and configured for opening and closing fluid communication between the plurality of fluid lines and a rotating clutch for engaging and disengaging the rotating clutch respectively;
- a compensator feed valve in fluid communication with the plurality of fluid lines and the second valve and configured for supplying the fluid to the second valve, with the second valve configured for directing the fluid to the rotating clutch to provide a back pressure to the rotating clutch when the second valve disengages the rotating clutch;
- a third electronically controlled hydraulic valve in fluid communication with at least one of the plurality of fluid lines and configured for opening and closing fluid communication between the plurality of fluid lines and a damper bypass clutch for engaging and disengaging the damper bypass clutch respectively; and
- a fourth electronically controlled hydraulic valve in fluid communication with a rotor lubrication circuit, a stator lubrication circuit and the pressure regulator valve, the fourth valve configured for regulating a flow of the fluid between the pressure regulator valve, the rotor lubrication circuit and the stator lubrication circuit;

wherein the pressure regulator valve opens fluid communication with the fourth valve in response to the line pressure of the fluid reaching a pre-determined level, and wherein the fourth valve continuously maintains open fluid communication between the pressure regulator valve and the first lubrication circuit, and the fourth valve opens fluid communication with the second lubrication circuit in response to the line pressure of the fluid reaching a pre-determined level; and wherein the first valve disengages the stationary clutch and the second valve disengages the rotating clutch to operate the hybrid drive unit in a first mode, the first valve engages the stationary clutch and the second valve disengages the rotating clutch to operate the hybrid drive unit in a second mode, the first valve engages the stationary clutch and the second valve engages the rotating clutch to operate the hybrid drive unit in a third mode, and the first valve disengages the stationary clutch and the second valve engages the rotating clutch to operate the hybrid drive unit in a fourth mode.

* * * * *